United States Patent
Shitamatsu et al.

(10) Patent No.: US 6,829,533 B2
(45) Date of Patent: Dec. 7, 2004

(54) ON-VEHICLE ROUTE GUIDANCE DEVICE AND ROUTE GUIDANCE METHOD

(75) Inventors: Ryota Shitamatsu, Kanagawa (JP); Yasushi Kikuchi, Kanagawa (JP); Takuji Nakazawa, Kanagawa (JP); Tohru Futami, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/435,054

(22) Filed: May 12, 2003

(65) Prior Publication Data

US 2003/0216860 A1 Nov. 20, 2003

(30) Foreign Application Priority Data

May 20, 2002 (JP) ........................................ 2002-144267

(51) Int. Cl.[7] .............................................. G01C 21/34
(52) U.S. Cl. .................... 701/211; 701/209; 340/995.19
(58) Field of Search ................................ 701/211, 209, 701/201; 340/995.19, 995.1

(56) References Cited

U.S. PATENT DOCUMENTS

| 6,405,129 | B1 | * | 6/2002 | Yokota ........................ 701/208 |
| 6,411,895 | B1 | | 6/2002 | Lau et al. |
| 6,507,291 | B1 | | 1/2003 | Schreiner |
| 6,671,619 | B2 | * | 12/2003 | Kusano et al. ............... 701/209 |

FOREIGN PATENT DOCUMENTS

| DE | 196 14 940 A1 | 10/1997 |
| DE | 199 33 666 A1 | 1/2001 |
| JP | 8-240438 A | 9/1996 |

* cited by examiner

Primary Examiner—Marthe Y. Marc-Coleman
(74) Attorney, Agent, or Firm—Foley & Lardner

(57) ABSTRACT

Information is stored relating to zones in which there are a plurality of POIs including at least one parking lot, a parking lot in a zone which has been selected from among these zones which are stored in memory is set as a destination point, a route is searched out to that parking lot based upon a road map, and the driver is guided to that parking lot based upon the route which has been found.

10 Claims, 13 Drawing Sheets

FIG.3

| POI NAME | P LATITUDE/ LONGITUDE | P GENRE CLASSIFICATION | P ADDRESS CLASSIFICATION | P TELEPHONE NUMBER | P SUPPLEMENTAL INFORMATION |
|---|---|---|---|---|---|
| | | | | | |
| | | | | | |
| | | | | | |
| .... | .... | .... | .... | .... | .... |

FIG.12

| POI NAME | P LATITUDE/ LONGITUDE | P GENRE CLASSIFICATION | ADDRESS CLASSIFICATION | TELEPHONE NUMBER | POI INFORMATION | ZOI NAME | REPRESENTATIVE POINT FLAG | Z GENRE CLASSIFICATION |
|---|---|---|---|---|---|---|---|---|
| | | | | | | | | |
| | | | | | | | | |
| | | | | | | | | |
| | | | | | | | | |
| ..... | ..... | ..... | ..... | ..... | ..... | ..... | ..... | ..... |

REPRESENTATIVE POINT FLAG :
ZONE REPRESENTATIVE PARKING SPACE = 1 :
OTHER = 0

ON-VEHICLE ROUTE GUIDANCE DEVICE AND ROUTE GUIDANCE METHOD

BACKGROUND OF THE INVENTION

1. Field of the Invention

The present invention relates to an on-vehicle route guidance device and to a route guidance method which guide a vehicle driver by showing a route to a destination point.

2. Description of the Related Art

There is a per se known route guidance device (see Japanese Laid-Open Patent Publication No. 08-240438), in which a point of interest (POI) is set as the destination point by designating the name, address, the telephone number or the like of that POI and then the most suitable route to the destination point is searched for.

SUMMARY OF THE INVENTION

However, with such a prior art type route guidance device, since a POI such as an institution or the like is set as the destination point and route searching is performed (this will hereinafter be termed route searching by POI), when traveling to a business area including a lot of buildings or the like, there is the problem in that searching for a POI which is a large company building or the like by setting it as the destination point can be difficult to perform. Moreover, in a business zone or the like, it often may happen that there is no parking lot (parking space) at the POI which is set as the destination point, or that although there is such a parking lot it is full or is congested, so that it is necessary for the driver again to search for a parking lot in the area around the destination point. Furthermore, even if the driver sets a parking lot in the area around a business zone or the like as the destination point, after he has parked the vehicle, it is necessary for him again to search for the actual place at which the institution which he desires to visit is located.

It would be desirable to provide an on-vehicle route guidance device and a route guidance method which smoothly perform route guidance to a region (a zone) in which there are a plurality of POIs including at least one parking lot.

An on-vehicle route guidance device according to the present invention comprises a map storage device which stores a road map, a zone storage device which stores information related to zones in which there are a plurality of POIs including at least one parking lot, a zone selection device which selects any zone from among the zones which are stored in the zone storage device, a route search device which sets a parking lot within a zone which has been selected by the zone selection device as a destination point, and which searches out a route to that parking lot based upon a road map which is stored in the map storage device and a route guidance device which guides the vehicle driver to that parking lot along the route which has been searched by the route search device.

An on-vehicle route guidance device according to the present invention performs wireless communication with an information center. The information center comprises a map storage device which stores a road map, a zone storage device which stores information related to zones in which there are a plurality of POIs including at least one parking lot and a route search device which sets a parking lot in a zone as a destination point and searches out a route to that parking lot based upon a road map which is stored in the map storage device. This on-vehicle route guidance device comprises a zone selection device which selects any zone from among the zones which are stored in the zone storage device and a route guidance device which commands the information center to search for a route to a parking lot which has been selected by the zone selection device, and which guides the vehicle driver to that parking lot along a route which has been searched by the information center.

A route guidance method according to the present invention comprises setting as a destination point a parking lot in a zone which has been selected from among these zones which are stored, based upon information stored in a memory related to zones in which there are a plurality of POIs including at least one parking lot, searching out a route to that parking lot which has been set as the destination point based upon a road map and guiding the driver to that parking lot based upon the route which has been searched.

A route guidance method according to the present invention comprises selecting a zone selected from among the zones in which there are a plurality of POIs including at least one parking lot, commanding an information center to search for a route to the parking lot within the zone which has been selected, receiving a route which has been searched from the information center and guiding the vehicle driver to that parking lot based upon the route which has been received.

BRIEF DESCRIPTION OF THE DRAWINGS

FIG. 3 shows the more detailed structure of a POI database.

FIG. 12 shows the construction of a POI database in which the attribute data of zones has been added to and expanded.

DETAILED DESCRIPTION OF THE PREFERRED EMBODIMENTS

First Embodiment

Figure 1:
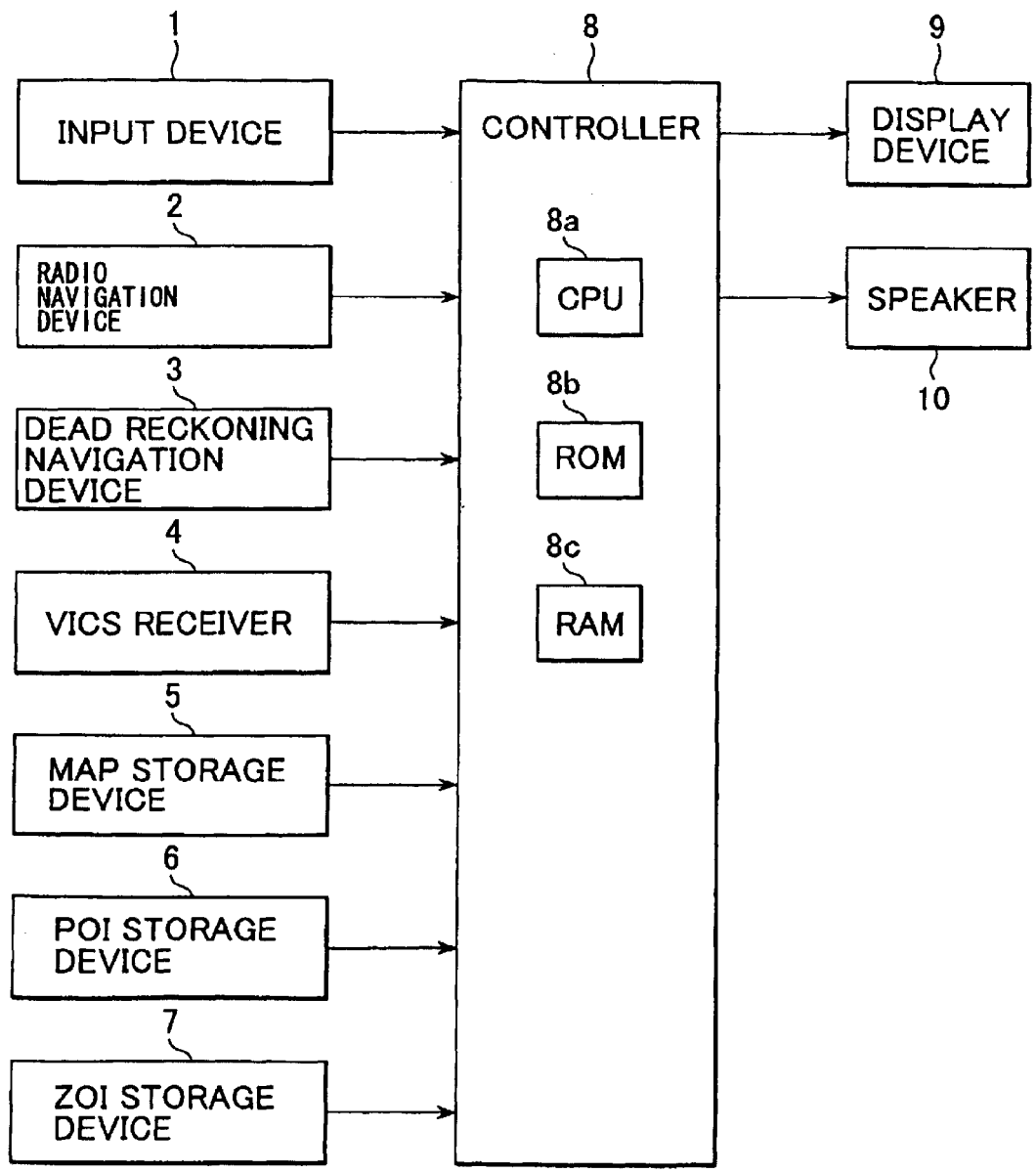
FIG. 1 shows the structure of an on-vehicle route guidance device which is a first preferred embodiment of the present invention.

FIG. 1 is a figure showing the structure of an on-vehicle route guidance device which is a first preferred embodiment of the present invention. An input device 1 includes various types of switches and/or cross-shaped buttons or the like which are used by the vehicle driver when setting a destination point or selecting items from menus on a display device. A radio navigation device 2 comprising a GPS receiver detects the current position of the vehicle. A dead reckoning navigation device 3 obtains the movement track of the vehicle based upon the results of detection by a traversed distance detector and a movement azimuth detector not shown in the figures, and detects the current position of the vehicle by performing map matching against a road map. A VICS (Vehicle Information Communication System) receiver 4 receives signals containing road traffic information from beacon transmitters (also not shown) set up at the roadside.

A map storage device 5 stores road map data. A POI storage device 6 stores a database for setting a point upon a map such as shops, institutions or the like as a destination point and performing route searching (route searching by POI). A ZOI storage device 7 stores a database for performing route searching (hereinafter termed route searching by ZOI (Zone Of Interest)) by taking, as a destination point, a region (hereinafter termed a zone) upon a map in which there are a plurality of POIs including at least one parking lot, for examples, a business zone in which there are a plurality of shops or department stores, a recreational zone in which there are a plurality of game centers or cinemas, a refreshment zone in which there are a plurality of restaurants, or the like.

A controller 8 comprises a CPU 8a, a ROM 8b, a RAM 8c and the like, and searches out a route to the destination point based upon actuation commands inputted by the driver from the input device 1, information as to the current position of the vehicle from the radio navigation device 2 and the dead reckoning navigation device 3, road traffic information from the VICS receiver 4, road map data from the map storage device 5, POI data related to points upon the map from the POI storage device 6 and ZOI data related to zones upon the map from the ZOI storage device 7. The guide route which has been found is displayed upon a display device 9 along with a road map of the surroundings of the current position of the vehicle, and route guidance to the destination point is provided by a voice guidance through a speaker 10.

Figure 2:
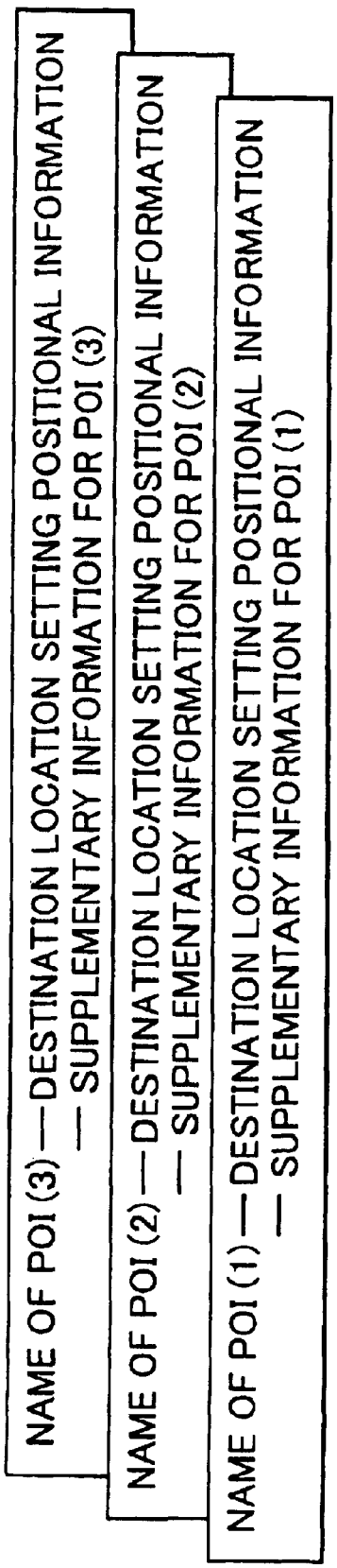
FIG. 2 shows the overall structure of a POI database.

FIG. 2 is a figure showing the basic structure of the POI database which is stored in the POI storage device 6. This POI database is used when performing route searching by setting a point upon a map of institutions or the like as the destination point. The POI database is built up from the names of POI such as institutions, positional information (latitude and longitude) and supplemental information. When setting a POI such as an institution or the like as the destination point and performing route searching, data in this POI database is searched and the positional information for the desired POI is read out, and the most suitable route to the destination point is searched out by using a per se known Dijkstra method or the like.

FIG. 3 is a figure showing the structure of the POI database. For each POI such as an institution or the like, this POI database contains its name, its latitude and longitude, its genre (type) classification, its address classification, its telephone number, its supplemental information and the like. It is to be noted that the expression "genre classification" means the type of the POI, such as "restaurant", "department store", "hospital", "cinema", or the like.

Figure 4:
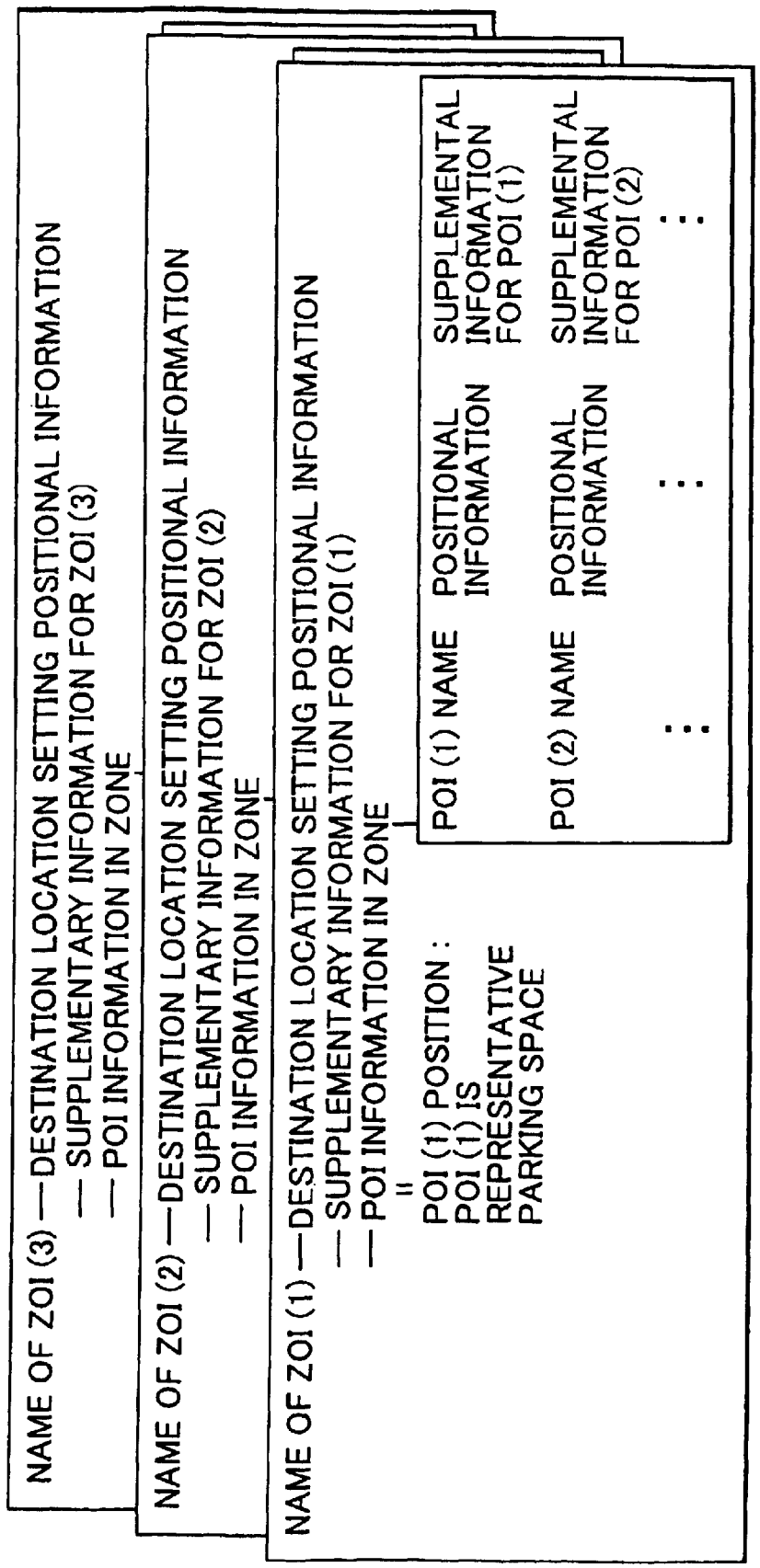
FIG. 4 shows the overall structure of a ZOI database.

FIG. 4 is a figure showing the overall structure of the ZOI database which is stored in the ZOI storage device 7. In the route guidance device according to the first preferred embodiment of the present invention, in addition to the POI database which has been described above stored in the POI storage device 6, there is provided a ZOI database in the ZOI storage device 7 for performing route searching by setting as the destination point a zone upon a map in which there are a plurality of POIs including at least one parking lot, such as a business district, a pleasure district, a restaurant district or the like.

This ZOI database is built up from names of ZOI such as business zones or the like, positional information, supplemental information, and information regarding POIs in these zones. In this first preferred embodiment of the present invention, a suitable parking lot is selected in a zone in which there are a plurality of POIs including at least one parking lot, and the position of this parking lot is defined as being a representative position for this zone. The latitude and longitude of the position of this parking lot are the positional information for the ZOI. The supplemental information for the ZOI is information for presentation of a characteristic or representative POI within the zone. The POI information for the ZOI data is POI information related to representative institutions or shops within the zone, and the individual POI information includes names, positional information (latitude and longitude) and supplemental information. It is to be noted that the first item of POI information is designated as POI(1), and POI(1) is POI information relating to the parking lot which is the representative position for the zone.

Figure 5:
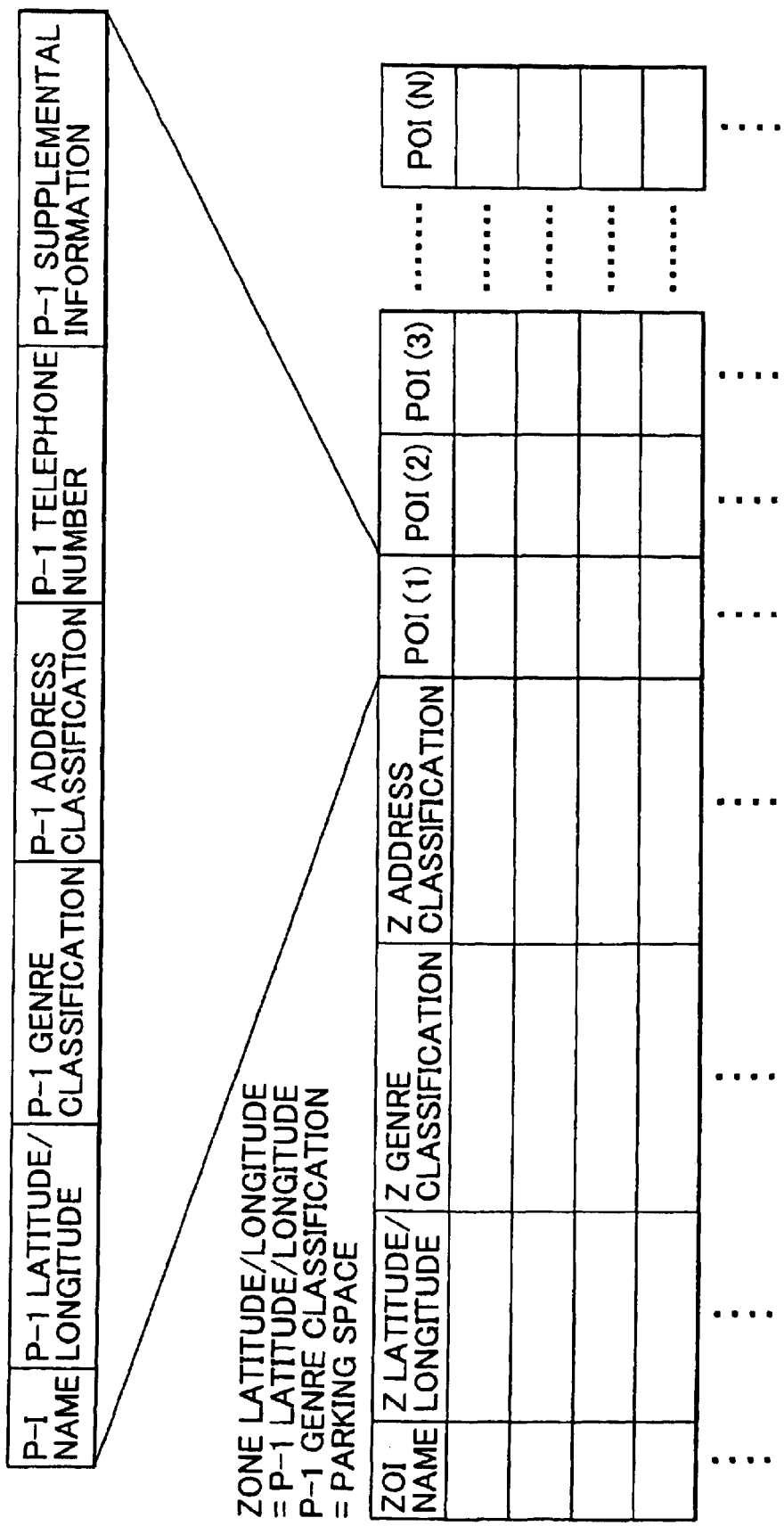
FIG. 5 shows the more detailed structure of a ZOI database.

FIG. 5 is a figure showing the structure of this ZOI database. This ZOI database is made up from the name of a ZOI such as a business zone or the like, its latitude and longitude, its genre classification, its address classification, information regarding POIs within the zone and the like. It is to be noted that here the expression "genre classification" means the type of the zone such as a business zone in which there are various types of shop or department stores or the like, a recreational zone in which there are game centers or cinemas, a refreshment zone in which there are restaurants and the like, an educational zone in which there are libraries or museums or the like, a rest zone in which there are parks or scenic spots or the like. Furthermore, the information regarding a POI within the zone includes its name, latitude and longitude, genre classification, address classification, telephone number, supplemental information and the like.

Figure 6:
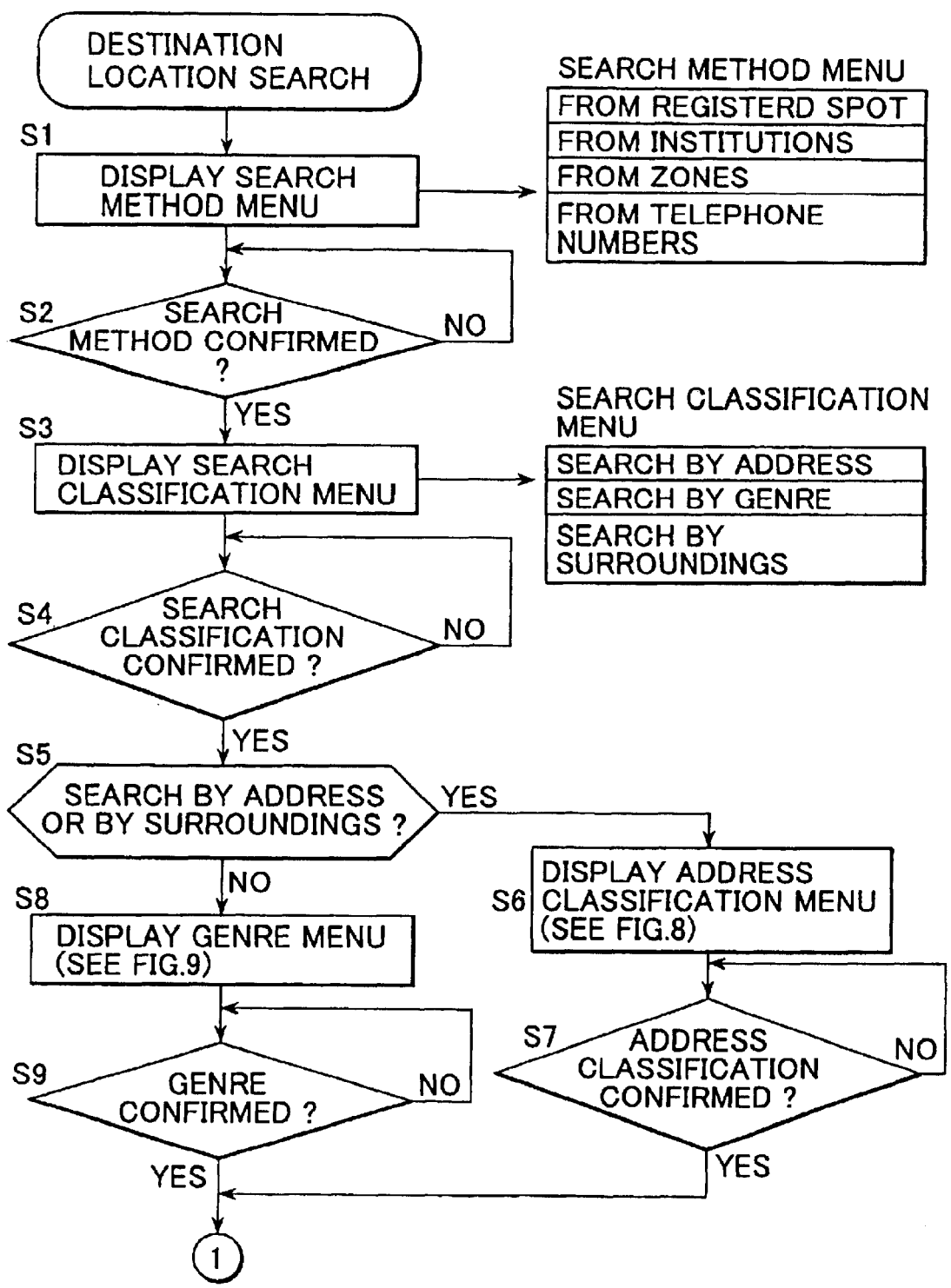
FIG. 6 is a flowchart showing a destination point search procedure according to this first preferred embodiment of the present invention.
Figure 7:
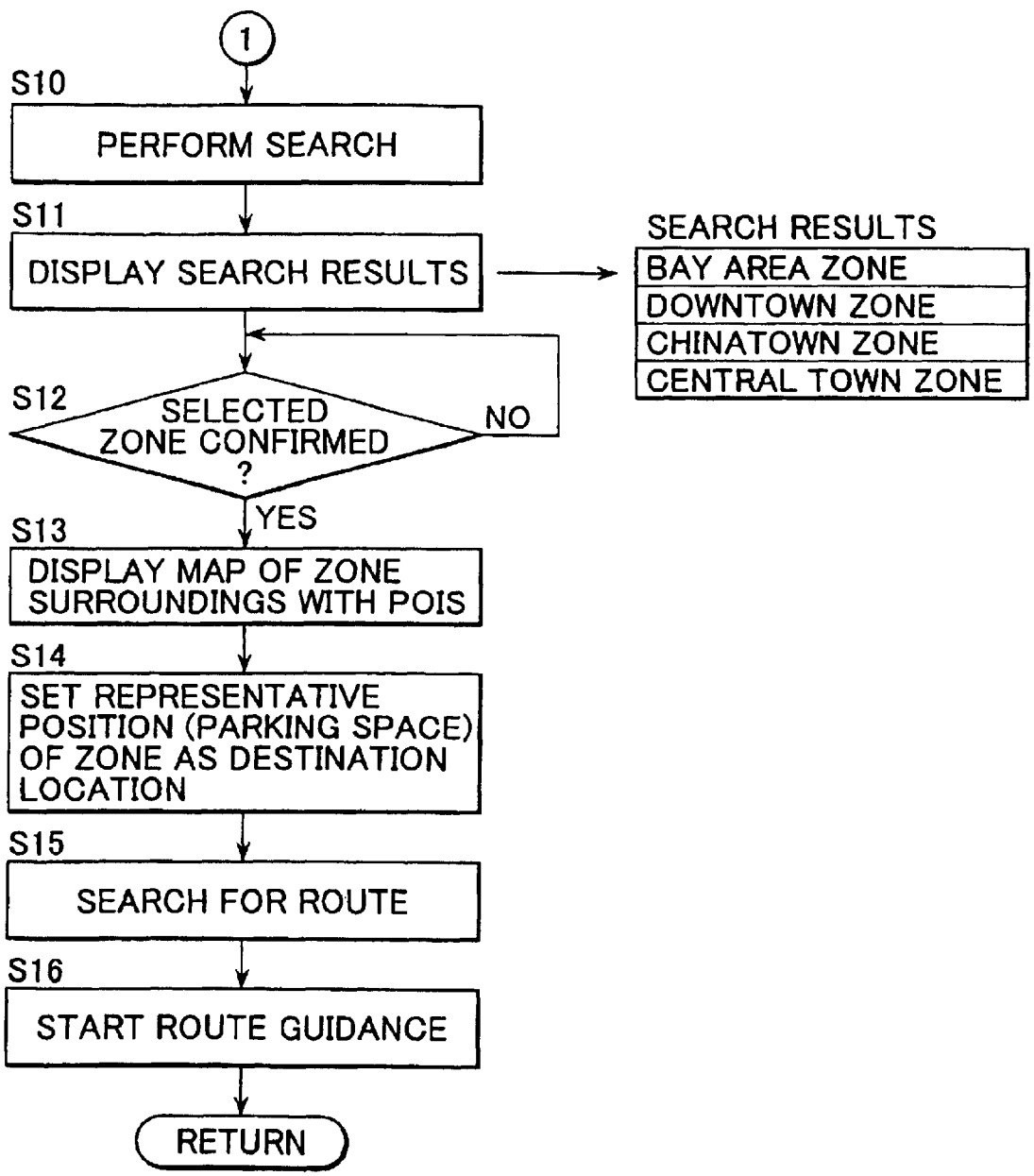
FIG. 7 is a flowchart, continuing on from the flowchart shown in FIG. 6, showing this destination point search procedure according to this first preferred embodiment of the present invention.

FIGS. 6 and 7 are flowcharts showing the destination point search procedure in this first preferred embodiment of the present invention. The CPU 8a in the controller 8 starts this destination point search procedure when a destination point search menu is selected upon a menu screen for route guidance which has been displayed upon the display device 9.

In the step S1, a search method menu for the destination point is displayed upon the display device 9. In this search method menu, there are available items such as "from registered spot", "from POIs", "from zones", "from telephone numbers" and the like as shown in FIG. 6. Since, among these items, the methods for searching which are employed in the cases of "from registered spot", "from POIs" and "from telephone numbers" are the same as in the case of route searching by POI as in the prior art, the explanation of these types of route searching will be curtailed. Accordingly, in the following, only the case in which "from zones" has been selected from this menu will be explained.

In the next step S2, a decision is made as to whether or not the search method which has been selected with the input device 1 has been confirmed. If it is decided that the search method which has been selected with the input device 1 has been confirmed, the flow of control proceeds to the step S3, while if it is decided that the search method which has been selected with the input device 1 has not as yet been confirmed, the flow of control loops round to wait in this step S2. In the step S3, the search classification menu is displayed upon the display device 9. In this search classification menu, as shown in FIG. 6, there are included the items "search by address", "search by genre", "search by surroundings" and the like. After this step S3, the flow of control proceeds to the step S4, in which a decision is made as to whether or not the search classification which has been selected with the input device 1 has been confirmed. If it is decided that the search classification has been confirmed, the flow of control proceeds to the step S5, while if it is decided that the search classification has not as yet been confirmed, the flow of control loops round to wait in this step S4.

Figure 8:
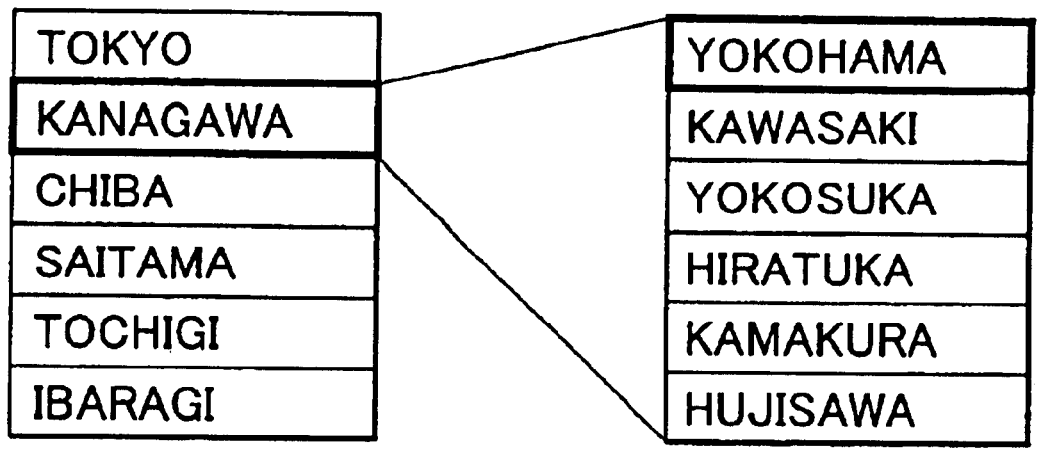
FIG. 8 shows an example of a display of an address classification menu.

In the step S5, a decision is made as to whether or not the search classification which has been selected corresponds to "search by address" or "search by surroundings". If it is decided that the search classification corresponds to "search by address" or "search by surroundings", then the flow of control proceeds to the next step S6. In the step S6, an address classification menu such as the one shown in FIG. 8 is displayed upon the display device 9, in order to perform searching of a zone by designating an address, or in order to perform searching of a zone around a designated address. In the example shown in FIG. 8, the example is shown in which "Kanagawa Prefecture" has been selected from the region address menu, and then "Yokohama City" has been selected from among the principal cities within Kanagawa Prefecture. In the next step S7, a decision is made as to whether or not the address classification which has been selected with the input device 1 has been confirmed. If it is decided that the address classification has been confirmed by actuation of the input device 1, the flow of control proceeds to the step S10 of the flowchart shown in FIG. 7, while if it is decided that the address classification has not as yet been confirmed, the flow of control loops round to wait in this step S7.

Figure 9:
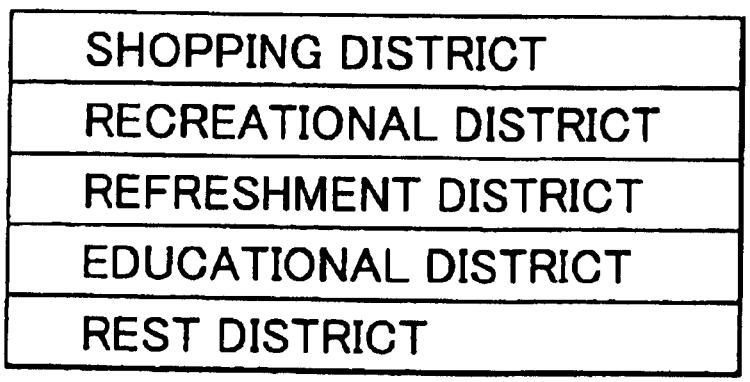
FIG. 9 shows an example of a display of a genre menu to set a destination.

On the other hand, if in the decision of the step S5 it is decided that "search by genre" has been selected, then the flow of control is transferred to the step S8. In the step S8, a zone genre menu such as the one shown in FIG. 9 is displayed upon the display device 9, in order to perform searching of the zone by designating a genre. In the step S9 following the step S8, a decision is made as to whether or not the genre which has been selected with the input device 1 has been confirmed. If it is decided that the genre which has been selected has been confirmed by actuation of the input device 1, the flow of control proceeds to the step S10 of the flowchart shown in FIG. 7, while if it is decided that the selected genre has not as yet been confirmed, the flow of control loops round to wait in this step S9.

In the step S10 of the flowchart shown in FIG. 7, data in the ZOI database stored in the ZOI storage device 7 is searched, and a zone of the address or the genre which has been selected by the operator is found. In the next step S11 after the step S10, the results of zone searching as shown in FIG. 7 are displayed upon the display device 9. The operator selects the desired zone from among these zones which are displayed upon the display device 9 by using the input device 1.

In the next step S12 after this step S11, a decision is made as to whether or not the zone which has been selected has been confirmed by actuation of the input device 1. If it is decided that the zone which has been selected has been confirmed, then the flow of control proceeds to the step S13, while if it is decided that the selected zone has not as yet been confirmed, the flow of control loops round to wait in this step S12.

In the step S13, along with displaying a road map of the selected zone upon the display device 9, voice guidance for the zone is provided via the speaker 10. Concretely, the position of the zone is obtained by searching in the ZOI database stored in the ZOI storage device 7 shown in FIG. 5, based upon the name of the zone which has been selected. And a road map centered upon the selected zone is read out from the map storage device 5, and this map is displayed upon the display device 9. Furthermore, the POIs which are included in the selected zone are read out from the ZOI database, and, for each of these POIs, an icon of a type corresponding to its genre is displayed as. an overlay in the appropriate position upon the road map on the display device 9.

Figure 10:
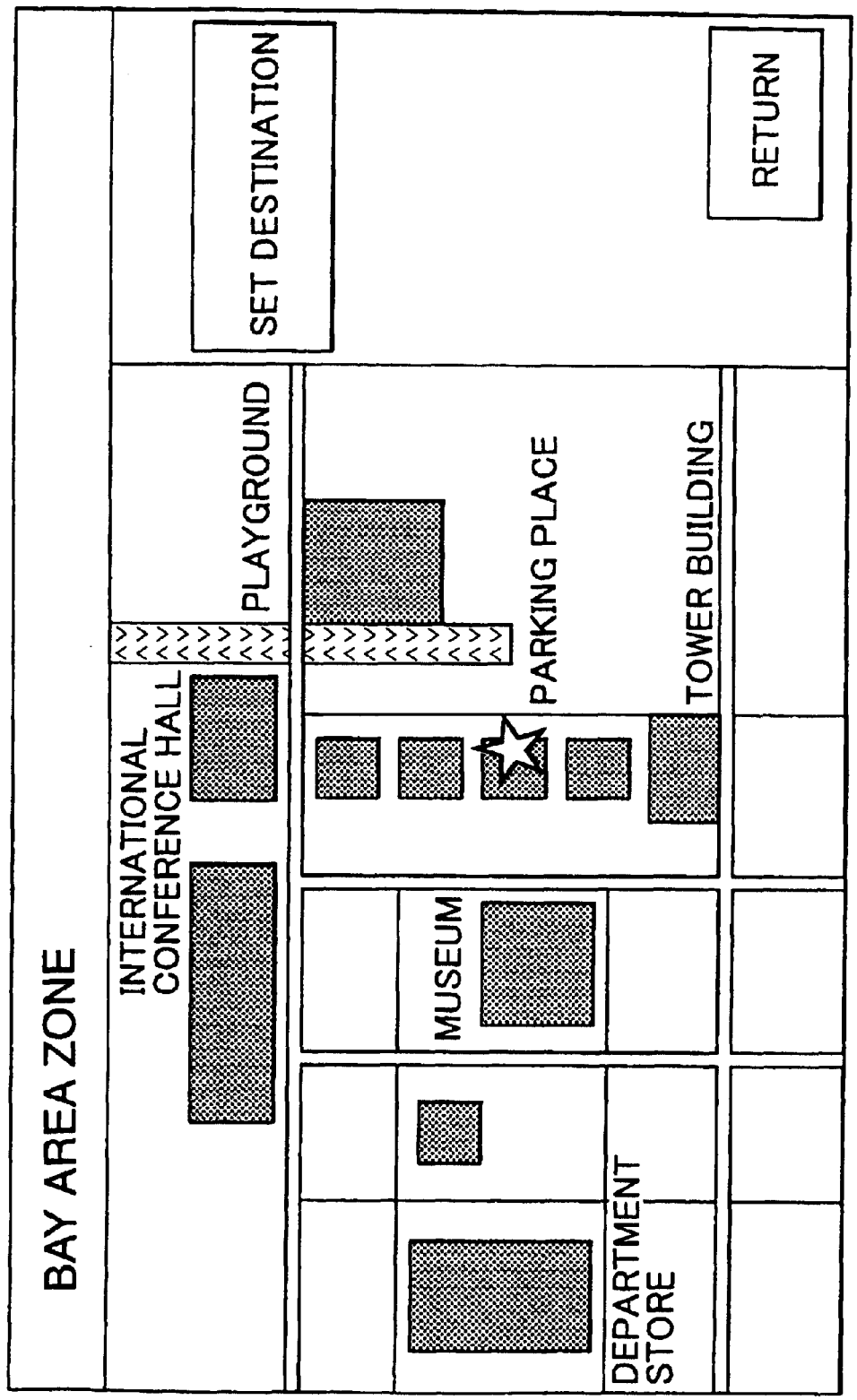
FIG. 10 shows an example of a display of a bay area map.

FIG. 10 shows an example of display of a map of the bay area zone of Yokohama City. The representative position for this bay area zone is the central parking. Upon this map of the bay area zone, main POIs such as tower buildings, museums, department stores, amusement parks, international conference halls and the like are displayed as icons.

In the next step S14 following the step S13, the first POI information POI(1) of the selected zone is read out from the ZOI database. This POI information POI(1) is the POI information for the parking lot which is the representative position for the selected zone, and it includes its latitude and longitude information. In this preferred embodiment, the position of this parking lot which is the representative position for this zone is set as a destination point. When the destination point has been set, the flow of control proceeds to the step S15. In the step S15, based upon the road map data, the most suitable route to the parking lot which has been set as the destination point is found.

In the next step S16 following the step S15, along with reading out a road map of the surroundings of the current position of the vehicle from the map storage device 5 and displaying it upon the display device 9, a route to the parking lot in the zone which is the result of the search described above is superimposed as an overlay upon this road map, and route guidance is commenced by providing voice guidance via the speaker 10.

As has been described above, with the on-vehicle route guidance device according to this first preferred embodiment of the present invention, route guidance information is provided to the driver according to the following procedure. Information is stored in advance in the ZOI database related to zones upon the map in which there are a plurality of POIs including at least one parking lot, and the destination point is set to the parking lot within a zone which has been selected by the operator from among the zones which are stored in ZOI database. A route to the parking lot which has been set as the destination point is searched out based upon the road map data, and the driver is guided to the parking lot within the selected zone along the route which has been searched out. By doing this, it is possible smoothly to perform route guidance to a zone in which there are a plurality of POIs including at least one parking lot. In other words, since route searching for the parking lot within the selected zone is performed once the driver selects the desired zone, the convenience of operation for the operator are enhanced, it is not necessary for the driver to drive around searching for a parking lot after having arrived in the zone, and the probability of becoming involved in a queue for parking is reduced.

Furthermore, since the information related to the zones in the ZOI database includes information related to the POIs within the zones, accordingly, at the same time as performing route searching to the parking lot in a selected zone, the driver can obtain information about the POIs in the selected zone, and accordingly the convenience of operation and the ease of use of the device are enhanced.

Second Embodiment

With the on-vehicle route guidance device according to the first preferred embodiment of the present invention, in addition to a POI database of a type known from the prior art, a new ZOI database was provided, and an example was shown of performing route searching according to ZOI. However, with the on-vehicle route guidance device according to the second preferred embodiment of the present invention, no new ZOI database is provided, but instead zonal attributes are added to the POI database from the prior art, so that the database is unified.

Figure 11:
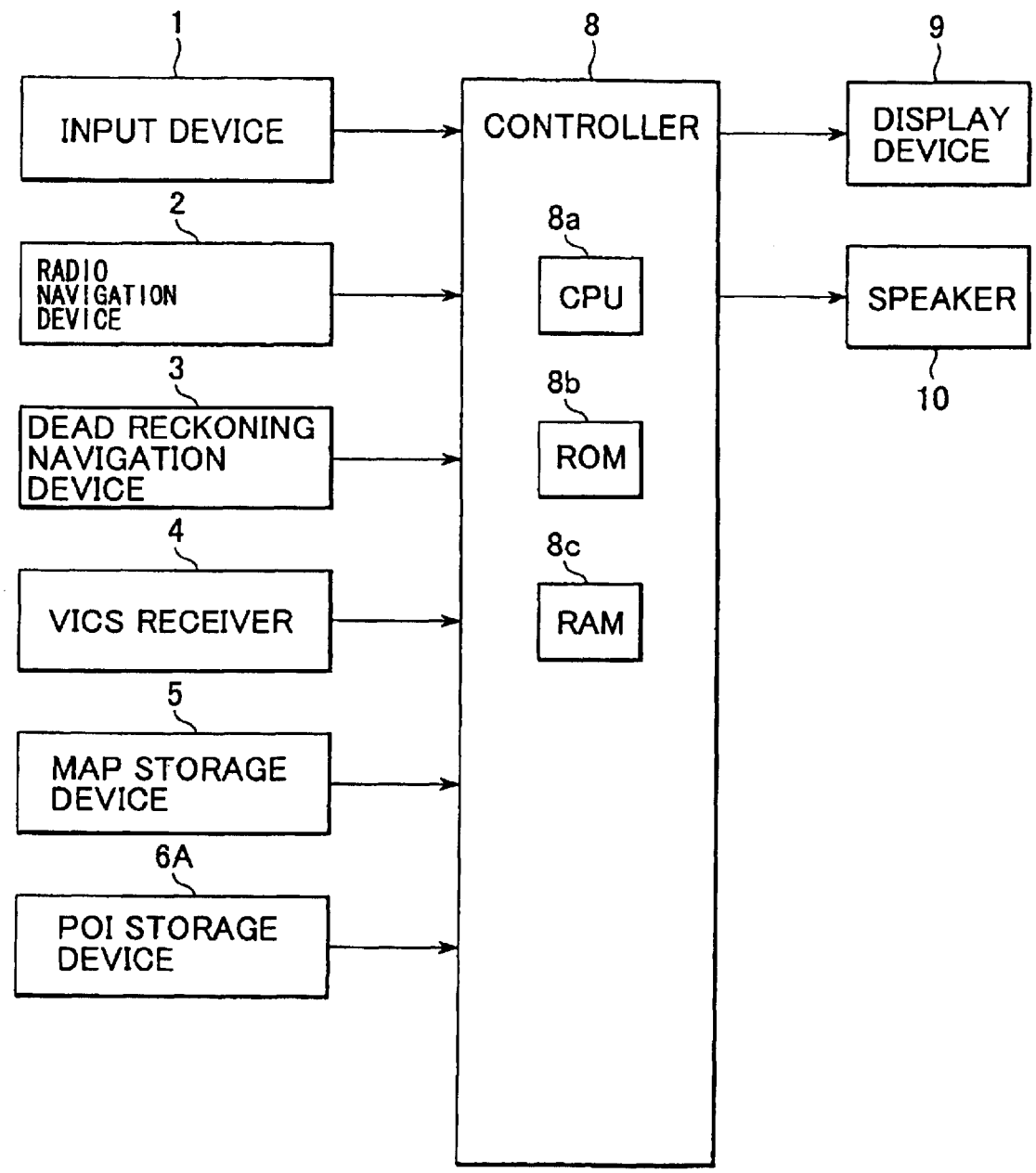
FIG. 11 shows the structure of an on-vehicle route guidance device which is a second preferred embodiment of the present invention.

FIG. 11 is a figure showing the structure of this on-vehicle route guidance device according to the second preferred embodiment. It is to be noted that, to elements which are the same as ones shown in FIG. 1, the same reference numbers are assigned, and their description will be curtailed. With this on-vehicle route guidance device according to the second preferred embodiment, the ZOI storage device 7 shown in FIG. 1 is not provided, and instead of the POI storage device 6 shown in FIG. 1 a POI storage device 6A is provided. This POI storage device 6A includes a POI database, expanded by the addition of zonal attributes.

FIG. 12 is a figure showing the structure of the POI database in the POI storage device 6A. This POI database includes, for each POI, its name, its latitude and longitude, its genre classification, its address classification, its telephone number, and its supplemental information, and these data items are the same as in the POI database of the first preferred embodiment shown in FIG. 3. However, the POI database in this second preferred embodiment also includes, for each POI, the following data items: the name of the zone (the ZOI) which includes this POI, its representative point flag, and its genre information. The representative point flag is set to 1 if this POI is the parking lot which is the representative position within its zone, and otherwise is set to 0.

The route search procedure for a zone using this type of POI database which has been expanded by the addition of zonal attribute data is the same as the route search procedure shown and described with reference to the flowcharts of FIGS. 6 and 7, with the variation that, instead of the ZOI database, the POI database which is stored in the POI storage device 6A is used.

In this manner the present invention can be implemented without newly providing a ZOI database, but just by expanding the prior art type POI database by adding zonal attributes to it, and accordingly it is possible to unify the databases, thus making do with a single storage device and thereby reducing the volume of storage, and moreover reducing the overall cost of the device.

Third Embodiment

The on-vehicle route guidance device according to the third preferred embodiment of the present invention is one which applies the present invention to a communication type vehicle navigation device which is endowed with a communication function. In other words, this on-vehicle route guidance device according to the third preferred embodiment of the present invention obtains information by wireless communication with an information center, which is a portion of the basic infrastructure of the road traffic system. This information center comprises a road map database, a POI database and a ZOI database, and, via wireless communication such as by the public telephone network or the like, the information center receives requests for route searching by POI or by ZOI from the on-vehicle route guidance device, and transmits the results of its search back to the on-vehicle route guidance device.

Figure 13:
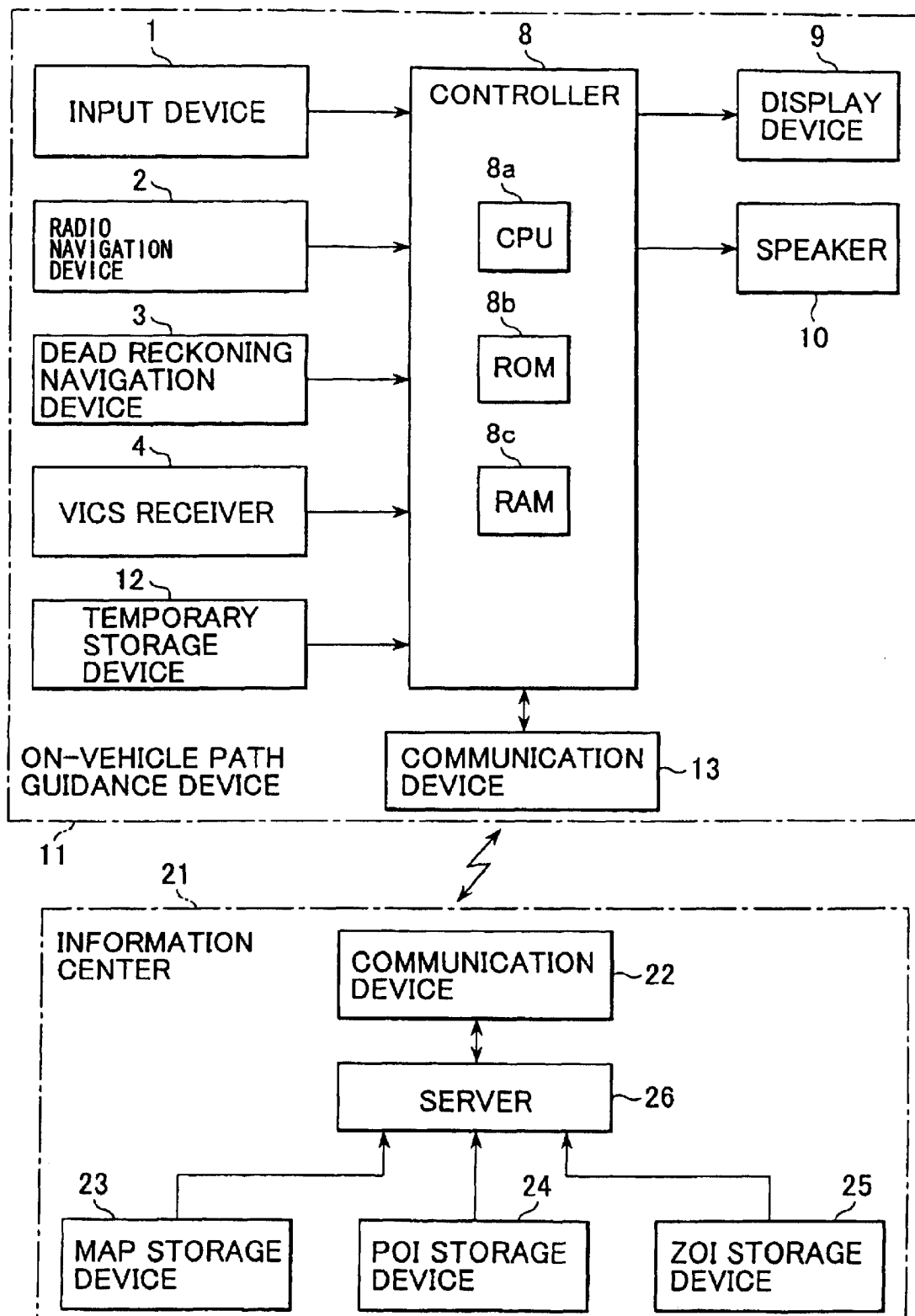
FIG. 13 shows the structure of an information center and of an on-vehicle route guidance device which is a third preferred embodiment of the present invention.

FIG. 13 is a figure showing the structure of the on-vehicle route guidance device and of the information center. It is to be noted that, to elements which are the same as ones shown in FIG. 1, the same reference numbers are assigned and their description will be curtailed. In this on-vehicle route guidance device 11, in addition to the input device 1, the radio navigation device 2, the dead reckoning navigation device 3, the VICS receiver 4, the controller 8, the display device 9 and the speaker 10 described above, there are also included a temporary storage device 12 for temporarily storing information which has been received from the information center 21 such as the results of searching for a route to the destination point and the like, and a communication device 13 which performs radio communications with the information center 21.

The information center 21 comprises a communication device 22 which perform radio communications with the on-vehicle route guidance device 11, a map storage device 23 which stores road maps, a POI storage device 24 which stores the POI database shown in FIG. 3, a ZOI storage device 25 which stores the ZOI database shown in FIG. 5, a server 26 and the like. Along with the server 26 performing searching for a route to the destination point instead of the on-vehicle route guidance device 11 (as was the case with the first preferred embodiment), the server 26 also provides various types of information presentation service such as presentation of road traffic information and the like to the on-vehicle route guidance device 11. It is to be noted that, although only one on-vehicle route guidance device 11 is shown in FIG. 13, it is supposed that in fact a large number of such on-vehicle route guidance devices will be operating at the same time in cooperation with the single information center 21.

Figure 14:
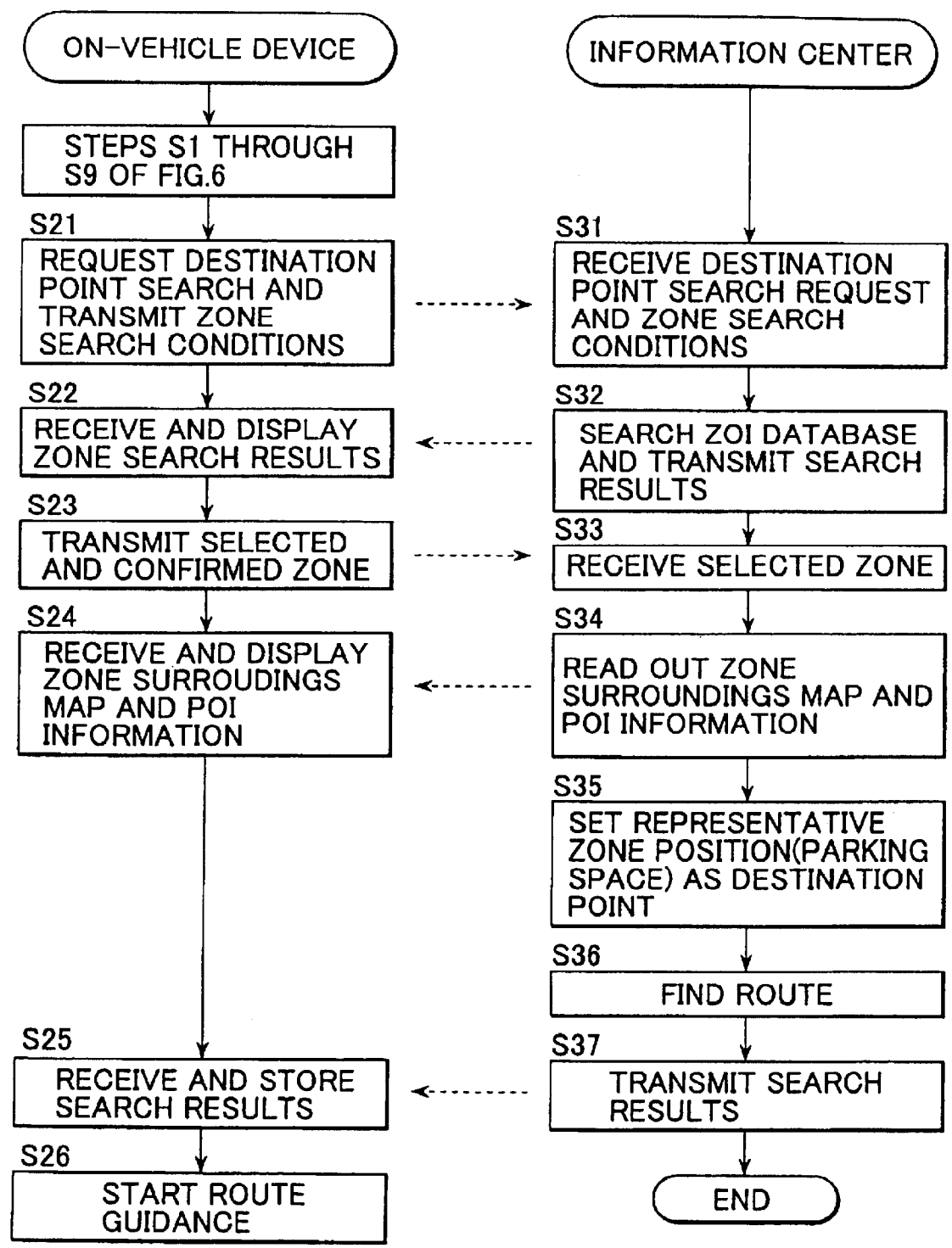
FIG. 14 is a flow chart showing a destination point search procedure according to this third preferred embodiment of the present invention.

FIG. 14 is a flowchart showing the destination point search procedure in this third preferred embodiment of the present invention. The CPU 8a in the controller 8 starts this destination point search procedure when the destination point search menu is selected upon the menu screen for route guidance which is displayed upon the display device 9. And then the CPU 8a executes the procedures of the steps S1 through S9 of the flowchart shown in FIG. 6. Next, in the step S21, the CPU 8a requests the information center 21 to perform the destination point search by transmitting the zone search conditions which have been confirmed in the step S7 or in the step S9.

In the step S31, the server 26 in the information server 21 receives the destination point search request and its zone search conditions from the on-vehicle route guidance device 11, and then the flow of control proceeds to the next step S32. In this step S32, the server 26 searches data in the ZOI database stored in the ZOI storage device 25 and finds a zone of the address or of the genre which has been selected by the operator. Then the server 26 transmits the zone which is the result of this search to the on-vehicle route guidance device 11.

The on-vehicle route guidance device 11 receives the zone search results in the step S22 and displays these zone search results upon the display device 9. The operator selects any zone from among the zones which are being displayed upon the display device 9 by utilizing the input device 1. In the step S23 following the step S22, the zone which has been selected and confirmed by the operator is transmitted to the information center 21.

In the step S33, the information center 21 receives the selected zone from the on-vehicle route guidance device 11.

In the next step S34 which follows the step S33, a road map of the selected zone is read out from the map storage device 23. Concretely, the position of the zone is obtained by searching in the ZOI database in the ZOI storage device 25 shown in FIG. 5, based upon the name of the zone which is selected. And, along with reading out from the map storage device 23, a road map which is centered upon the latitude and the longitude of the zone which has been selected, the POI information which is included in the selected zone is read out from the ZOI database. The map of the selected zone and the POI information within this selected zone which have been read out are transmitted to the on-vehicle route guidance device 11.

In the step S24, the on-vehicle route guidance device 11 receives this zone map and this POI information. Along with displaying the zone map which has received upon the display device 9, the on-vehicle route guidance device 11 also displays the position of each of the POIs upon this map as an overlaid icon of a type which corresponds to its genre.

In the step S35, the information center 21 which has transmitted the zone map and the POI information reads out from the ZOI database in the ZOI storage device 25 the first POI information POI(1) for the selected zone. This first information POI(1) is the POI information for the parking lot which is the representative position for the selected zone, and the POI information POI(1) includes its latitude and longitude information. This position of the parking lot which is the representative position for the selected zone is set as the destination point.

In the next step S36 which follows this step S35, the most suitable route to the parking lot in the selected zone is searched out, based upon the road map data which is stored in the map storage device 23. When this route search has been performed, the flow of control continues to the next step S37. In the step S37, the route to the zone parking lot and the road map data along the route, which constitute the result of the search, are transmitted to the on-vehicle route guidance device 11.

In the step S25, the on-vehicle route guidance device 11 receives the result of route searching and the road map data along the route which has been found, and stores them in the temporary storage device 12. Next, in the step S26, along with reading out the road map centered upon the current position of the vehicle from the temporary storage device 12 and displaying them upon the display device 9, the route to this parking lot which is the result of the search is displayed as an overlay upon this road map, and route guidance is commenced by providing a voice guide via the speaker 10.

As has been described above, with the on-vehicle route guidance device according to this third preferred embodiment of the present invention, route guidance information is provided to the driver according to the following procedure. The information center stores the road maps and information related to zones upon the map in which there are a plurality of POIs including at least one parking lot; the parking lot within a zone is set as the destination point; and a route is found to that parking lot within the zone, based upon the road maps. The on-vehicle route guidance device performs wireless communication with the information center, requests the information center to find a route to the parking lot within the zone selected by the operator and guides the driver to the parking lot within the zone along the route which has been found by the information center. By doing this, it is not necessary to provide a storage device in the on-vehicle route guidance device for storing the toad maps and the information related to the zones, so that it is possible to reduce the cost of the on-vehicle route guidance device, while obtaining the same operational results as were obtained with the first preferred embodiment of the present invention described above. Moreover, it is possible for the on-vehicle route guidance device to obtain the most up-to-date information at all times, since it is possible quickly and easily to update the road maps and the information related to the zones which are stored in the information center.

The disclosure of the following priority application is herein incorporated by reference: Japanese patent application 2002-144267, filed May 20, 2002.

What is claimed is:

1. An on-vehicle route guidance device, comprising:
   a map storage device which stores a road map;
   a zone storage device which stores information related to zones in which there are a plurality of point of interests (POIs) including at least one parking lot;
   a zone selection device which selects any zone from among the zones which are stored in the zone storage device;
   a route search device which sets a parking lot within a zone which has been selected by the zone selection device as a destination point, and which searches out a route to that parking lot based upon a road map which is stored in the map storage device, and
   a route guidance device which guides the vehicle driver to that parking lot based upon the route which has been searched by the route search device.

2. An on-vehicle route guidance device according to claim 1, wherein:
   the information related to the zones which is stored in the zone storage device includes information related to POIs in the zones; and further comprising:
   an information provision device which, when any one of the zones is selected by the zone selection device, provides information stored in the zone storage device related to POIs in the selected zone.

3. An on-vehicle route guidance device according to claim 1, wherein the route search device sets the parking lot as the destination point based on a zone selection input from the zone selection device and without receiving input of any specific destination point.

4. An on-vehicle route guidance device which performs wireless communication with an information center which comprises a map storage device which stores a road map, a zone storage device which stores information related to zones in which there are a plurality of points of interests (POIs) including at least one parking lot and a route search device which sets a parking lot in a zone as a destination point and searches out a route to that parking lot based upon a road map which is stored in the map storage device, comprising:
   a zone selection device which selects any zone from among the zones which are stored in the zone storage device; and
   a route guidance device which commands the information center to search for a route to a parking lot which has been selected by the zone selection device, and which guides the vehicle driver to that parking lot based upon a route which has been searched by the information center.

5. An on-vehicle route guidance device according to claim 4, wherein:
   the information related to the zones which is stored in the zone storage device includes information related to POIs in the zones; and further comprising:

an information provision device which, when any one of the zones is selected by the zone selection device, provides information stored in the zone storage device related to POIs in the selected zone.

6. An on-vehicle route guidance device according to claim 4, wherein the route guidance device comnmands the information center to search for the route to the parking lot based on a zone selected by the zone selection device and without receiving input of any specific destination point.

7. An on-vehicle route guidance device, comprising:

a map storage means for storing a road map;

a zone storage means for storing information related to zones in which there are a plurality of points of interests (POIs) including at least one parking lot;

a zone selection means for selecting any zone from among the zones which are stored in the zone storage means;

a route search means for setting a parking lot within a zone which has been selected by the zone selection means as a destination point, and for searching out a route to that parking lot based upon a road map which is stored in the map storage means, and a route guidance means for guiding the vehicle driver to that parking lot based upon the route which has been searched by the route search means.

8. An on-vehicle route guidance device which performs wireless communication with an information center outside the vehicle which comprises a map storage means for storing a road map, a zone storage means for storing information related to zones in which there are a plurality of points of interests (POIs) including at least one parking lot, and a route search means for setting a parking lot in a zone as a destination point and searches out a route to that parking lot based upon a road map which is stored in the map storage means, comprising:

a zone selection means for selecting any zone from among the zones which are stored in the zone storage means; and a route guidance means for commanding the information center to search for a route to a parking lot which has been selected by the zone selection means, and for guiding the vehicle driver to that parking lot based upon a route which has been searched by the information center.

9. A route guidance method, comprising:

setting as a destination point a parking lot in a zone which has been selected from among these zones which are stored, based upon information stored in a memory related to zones in which there are a plurality of points of interests (POIs) including at least one parking lot;

searching out a route to that parking lot which has been set as the destination point based upon a road map; and guiding the driver to that parking lot based upon the route which has been searched.

10. A route guidance method, comprising:

selecting a zone selected from among the zones in which there are a plurality of points of interests (POIs) including at least one parking lot, commanding a information center to search for a route to the parking lot within the zone which has been selected, receiving a route which has been searched from the information center; and guiding the vehicle driver to that parking lot based upon the route which has been received.

* * * * *